(12) United States Patent
Yamaguchi (10) Patent No.: US 9,341,717 B2
(45) Date of Patent: May 17, 2016

(54) APPARATUS FOR POSITION NOTIFICATION OF VEHICLE, METHOD AND COMPUTER-READABLE MEDIUM

(75) Inventor: Isao Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 459 days.

(21) Appl. No.: 12/944,252

(22) Filed: Nov. 11, 2010

(65) Prior Publication Data

US 2011/0128182 A1 Jun. 2, 2011

(30) Foreign Application Priority Data

Dec. 1, 2009 (JP) .................... 2009-273649

(51) Int. Cl.
| | |
|---|---|
| *G01S 13/08* | (2006.01) |
| *G01S 19/18* | (2010.01) |
| *B63G 8/00* | (2006.01) |
| *F42B 12/36* | (2006.01) |
| *B63G 8/41* | (2006.01) |

(52) U.S. Cl.
CPC .............. *G01S 19/18* (2013.01); *B63G 8/001* (2013.01); *F42B 12/365* (2013.01)

(58) Field of Classification Search
CPC ........ G01S 19/18; B63G 8/001; F42B 12/365
USPC .......................................... 114/322; 342/146
See application file for complete search history.

(56) References Cited

U.S. PATENT DOCUMENTS

| | | | | |
|---|---|---|---|---|
| 4,164,195 A | * | 8/1979 | Frigeni ................... | 114/322 |
| 4,686,927 A | * | 8/1987 | Hawkes et al. ........... | 114/312 |
| 5,050,523 A | * | 9/1991 | Schwemin et al. ....... | 114/259 |
| 5,235,931 A | * | 8/1993 | Nadolink ................. | 114/321 |
| 6,854,410 B1 | * | 2/2005 | King et al. ............... | 114/244 |
| 7,007,625 B2 | * | 3/2006 | Shelton ................... | 114/312 |
| 7,296,530 B1 | * | 11/2007 | Bernstein et al. ......... | 114/322 |
| 2004/0065247 A1 | * | 4/2004 | Horton ..................... | 114/322 |
| 2004/0194684 A1 | * | 10/2004 | Ellner ..................... | 114/221 R |
| 2005/0093691 A1 | * | 5/2005 | Kline et al. ............... | 340/539.13 |
| 2005/0204992 A1 | | 9/2005 | Shelton et al. | |

FOREIGN PATENT DOCUMENTS

| | | |
|---|---|---|
| JP | 3-282390 A | 12/1991 |
| JP | H4-244600 A | 9/1992 |
| JP | 7-318660 A | 12/1995 |
| JP | 2001-50698 A | 2/2001 |
| JP | 2001287694 A | 10/2001 |
| JP | 2004-226374 A | 8/2004 |
| JP | 2009-173073 A | 8/2009 |
| JP | 2010-137800 A | 6/2010 |
| WO | 2006065227 A1 | 6/2006 |

OTHER PUBLICATIONS

European Search Report for EP 10 01 5098 dated Feb. 25, 2011.
Japanese Office Action for JP Application No. 2009-273649 mailed on Aug. 27, 2013 with English Translation.
Japanese Office Action for JP Application No. 2009-273649 mailed on Apr. 1, 2014 with partial English Translation.

* cited by examiner

*Primary Examiner* — Frank J McGue (57) ABSTRACT

A vehicle position notification apparatus include a main body unit which includes at least a detection unit, an attachment unit and a communication unit; wherein the detection unit detects a body under detection; the attachment unit makes the main body unit adhere to the body under detection detected; and the communication unit transmits position information of the main body unit.

7 Claims, 8 Drawing Sheets

APPARATUS FOR POSITION NOTIFICATION OF VEHICLE, METHOD AND COMPUTER-READABLE MEDIUM

This application is based upon and claims the benefit of priority from Japanese Patent Application No. 2009-273649, filed on Dec. 1, 2009, the disclosure of which is incorporated herein in its entirety by reference.

TECHNICAL FIELD

The present invention relates to an apparatus, a method and a computer-readable medium for position notification of a vehicle which notifies positions of an underwater vehicle and a mother ship from which this underwater vehicle is started, periodically or intermittently.

BACKGROUND ART

In order to detect an underwater vehicle and so on, for example, in Japanese Patent Application Laid-Open No. 1995-318660, Japanese Patent Application Laid-Open No. 2001-287694 and Japanese Patent Application Laid-Open No. 1991-282390, a technology using a sensor such as a sonar or a magnetic detector is disclosed. In this technology, the sensor is fixedly installed or loaded on a warship. And by operating the sensor to follow the underwater vehicle, the position of the underwater vehicle is detected successively. Or by using a plurality of sensors, the position of the underwater vehicle is detected successively.

Figure 9:
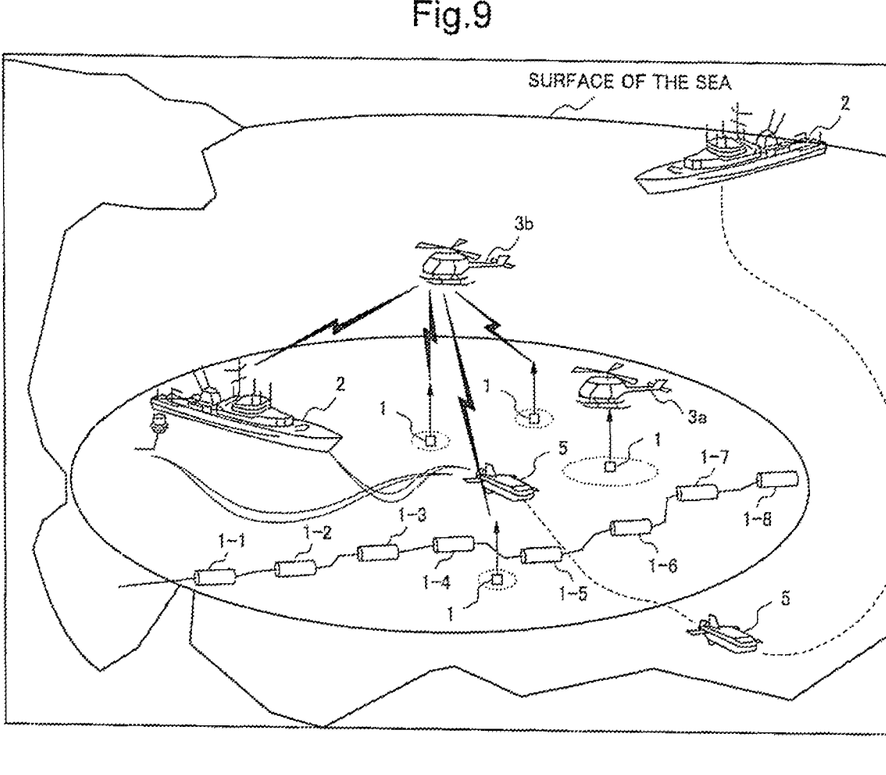
FIG. 9 is a schematic diagram showing a detection method of an underwater vehicle by related technology.

FIG. 9 is a schematic diagram showing a detection method of such the underwater vehicle. Sensor 1 such as sonar or a magnetic detector is installed on the warship or a helicopter 3a and so on, fixed at the bottom of the sea, or thrown into the bottom of the sea from the warship or the helicopter 3b and so on, and detects the underwater vehicle. The detection range of sensor 1 is a predetermined range with the position of the sensor itself as the center. Because the detection range of sensor 1 is limited as mentioned above, it is not possible to detect the underwater vehicle successively by an acoustic sensor such as a fixed sensor located at the bottom of the sea, or the sonar which is mounted on the warship or an airplane. Accordingly, in order to successively detect a position of moving underwater vehicle 5, it is necessary to detect the underwater vehicle 5 continually by the moving sensor 1 following the underwater vehicle 5 or by using a plurality of the sensors 1-1, 1-2 . . . 1-8.

However, when the underwater vehicle is detected successively or intermittently by the moving sensor 1 following the underwater vehicle 5 or by using a plurality of the sensors, propagation condition of sound and so on changes depending on the environmental condition in the water, and it is difficult to keep detecting it stably for a long time.

Also, even if the underwater vehicle can be detected, without the sensor following the detected underwater vehicle or without installing a large number of sensors, it is not possible to detect the position of a mother ship which starts this underwater vehicle or to which it returns. Accordingly, an organization and so on for which the underwater vehicle or the mother ship belongs to cannot be grasped sufficiently.

Also, as the sensor performs position detection only, when the distance between the detected underwater vehicle or the mother ship and the warship and so on which loads the sensor is far, it is not possible to inhibit the movement of the detected underwater vehicle or the mother ship.

Also, because the underwater vehicle 5 cannot perform a long time or a long distance operation independently, possibility that it returns to the mother ship 2 which started it is high. However, even if the underwater vehicle or the mother ship 2 can be detected by the sensor 1, as far as these relations cannot be detected.

SUMMARY

An exemplary object of the present invention is to provide an apparatus, a method and a computer-readable medium for position notification of a vehicle, which can grasp the position of an underwater vehicle and its mother ship continually which invaded an exclusive economic zone, a specific important harbor or a channel and so on. A vehicle position notification apparatus include a main body unit which includes at least a detection unit, an attachment unit and a communication unit; wherein the detection unit detects a body under detection; the attachment unit makes the main body unit adhere to the body under detection detected; and the communication unit transmits position information of the main body unit.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
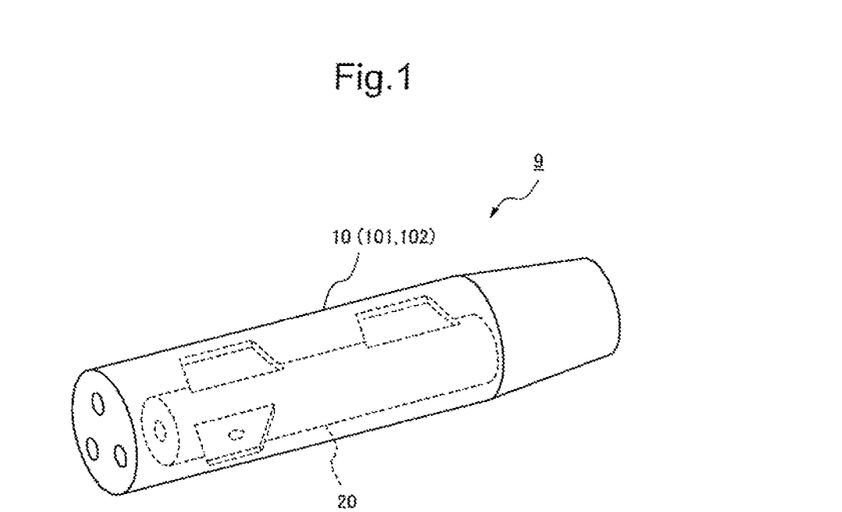
FIG. 1 is a perspective view of a vehicle position notification apparatus according to an exemplary embodiment of the present invention.

An exemplary embodiment of the present invention will be described with reference to drawings. FIG. 1 is a perspective view of a position notification apparatus of a vehicle according to an exemplary embodiment of the present invention. In FIG. 1, a vehicle position notification apparatus 9 includes a cylindrical underwater can body 10 and a movement notification body (main body unit) 20 installed inside the underwater can body 10.

Figure 2:
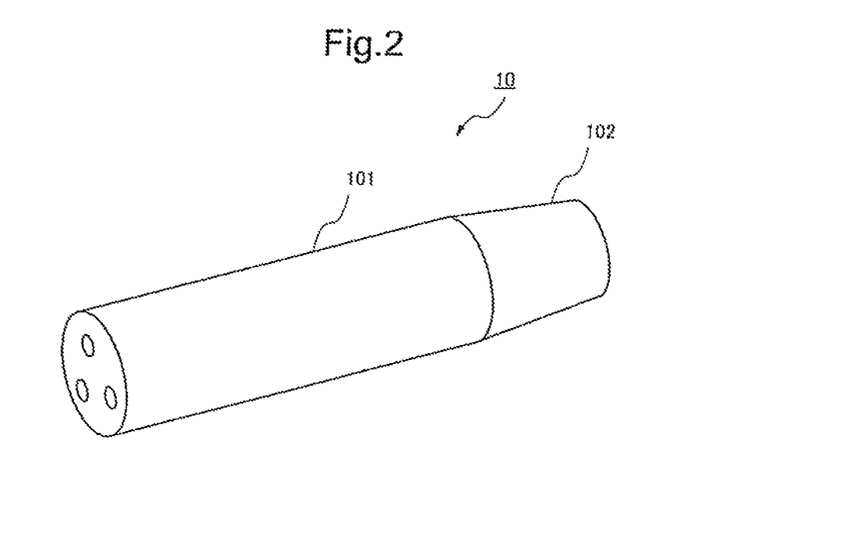
FIG. 2 is a perspective view of an underwater can body of a vehicle position notification apparatus according to an exemplary embodiment.

FIG. 2 is a perspective view of the underwater body 10 of vehicle position notification apparatus 9. The underwater body 10 includes a can body unit 101 and a power supply unit 102. The can body unit 101 and the power supply unit 102 are installed separably.

Figure 3:
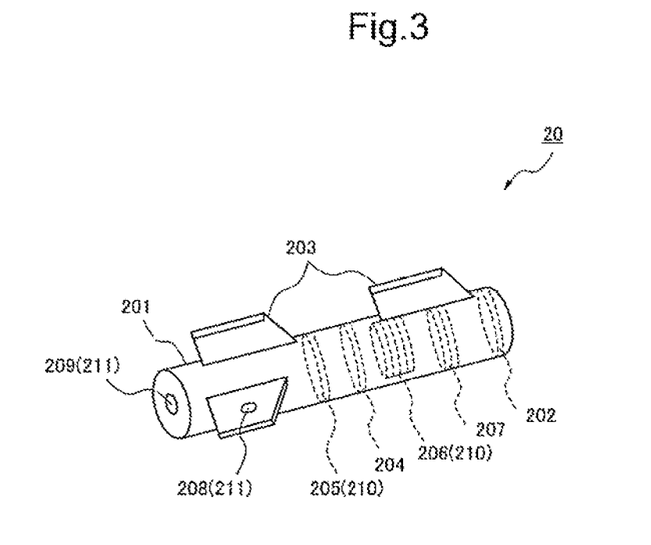
FIG. 3 is a perspective view of a movement notification body of a vehicle position notification apparatus according to an exemplary embodiment.

FIG. 3 is a perspective view of movement notification body 20. The movement notification body 20 includes a movement can body 201, a detection unit 202, an attachment unit 203, a communication unit 204, a control unit 210, a movement position calculation unit 207 and an underwater movement unit 211. The detection unit 202, the communication unit 204, the control unit 210 and the movement position calculation unit 207 are stored in the movement can body 201. Further, the control unit 210 includes a can body control unit 205 and the power control unit 206. Also, the underwater movement unit 211 includes a horizontal thruster 208 and a vertical thruster 209.

The detection unit 202 includes a plurality of sensors including an acoustic sensor or a magnetic sensor and so on and receives supply of electric power from a battery accommodated in the power supply unit 102. And the movement notification body 20 detects an underwater vehicle 7a or a mother ship 7b which travels in the neighborhood of the movement notification body itself using the detection unit 202. Hereinafter, a detection target such as the underwater vehicle 7a or the mother ship 7b is described, when appropriate, as a body under detection 7. In this case, by the body under detection 7, there is a case when only underwater vehicle (the first body under detection) 7a is meant, a case when only mother ship (the second body under detection) 7b is meant, or a case when both of them are meant. The detection unit 202 outputs a start signal to the can body control unit 205 and the power control unit 206 assuming that the body under detection 7 is detected when it detects a change in a reception direction or received signal strength of the sound or the magnetism from the body under detection 7 and when the reception direction is at an acute angle and the received signal strength is maximum. Further, as a technology in the detection unit 202 about a change in a reception direction or received signal strength, publicly known technology is applied.

The power control unit 206 controls supply of electric power to the detection unit 202 stored in the movement notification body 20 and so on. When a start signal is received from the detection unit 202, by driving the horizontal thruster 208, the can body control unit 205 makes the movement notification body 20 start from the underwater body 10. And in order to move the movement notification body 20 to the sending direction that is detected by an acoustic signal or a magnetic signal caused by the body under detection 7 which the detection unit 202 detected, the can body control unit 205 controls the horizontal thruster 208 and the vertical thruster 209.

When the can body control unit 205 approaches detected the body under detection 7, it starts the attachment unit 203 including a hook or an electromagnet. Therefore, when the attachment unit 203 is started, the movement notification body 20 adheres to a trunk of the body under detection 7 by the hook or the electromagnet and so on. Further, the movement notification body 20 includes foam material and water and so on so that it may have neutral buoyancy in the water.

When the movement notification body 20 adheres to the body under detection 7, the communication unit 204 is started. The communication unit 204 includes an acoustic pinger which transmits an acoustic signal. This acoustic signal functions as an acoustic marker, and can notify a current position of the movement notification body 20, that is, a current position of the body under detection 7. Also, the movement position calculation unit 207 includes an inertial navigation system (not shown). By the inertial navigation system, the current position of the movement notification body 20 is calculated and stored in a built-in memory unit (not shown).

At a predetermined time interval or when a condition decided in advance is satisfied, the communication unit 204 transmits position information about the current position of the movement notification body 20 which the movement position calculation unit 207 calculated, by an acoustic transmitter. The acoustic transmitter is built in the communication unit 204. Further, the communication unit 204 may include an antenna with a GPS (Global Positioning System) receiver and an extension cable as the need arises. The extension cable and the antenna are discharged on to the water when a condition decided in advance is satisfied. As a result, the GPS receiver receives a signal from a GPS satellite, and it becomes possible to calculate the current position of the movement notification body 20 based on this signal. The current position of calculated the movement notification body 20 is outputted by wireless.

Also by operating an acoustic sensor or a magnetic sensor and so on continually, and when judged that underwater vehicle 7a has approached the mother ship 7b, the detection unit 202 transmits the mother ship detection signal to the can body control unit 205. When the mother ship detection signal is received from the detection unit 202, the can body control unit 205 directs the attachment unit 203 to leave from underwater vehicle 7a and further controls the horizontal thruster 208 and the vertical thruster 209.

Also, based on a reception signal and a direction signal of the detection unit 202, and when judged that the movement notification body 20 which left from underwater vehicle 7a has approached the mother ship 7b and so on which is a target, the can body control unit 205 starts the attachment unit 203. As a result, the hook or the electromagnet of the attachment unit 203 is started, and the movement notification body 20 adheres to the trunk of the mother ship 7b and so on, which is the target.

Figure 4:
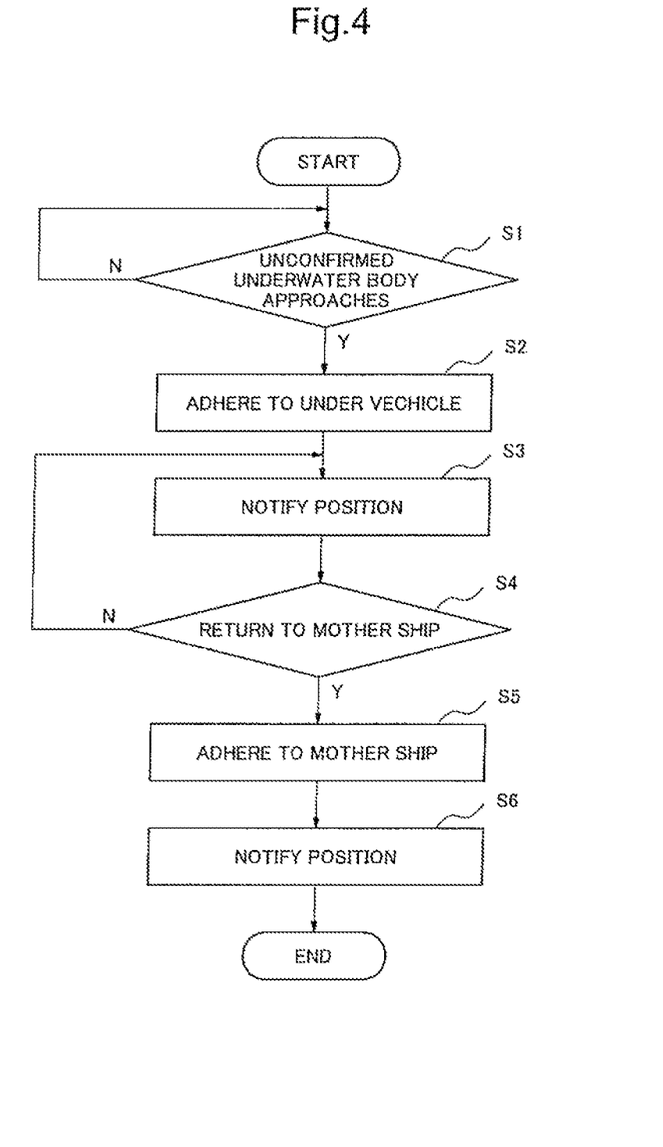
FIG. 4 is a flow chart of a position notification apparatus of a vehicle.
Figure 5:
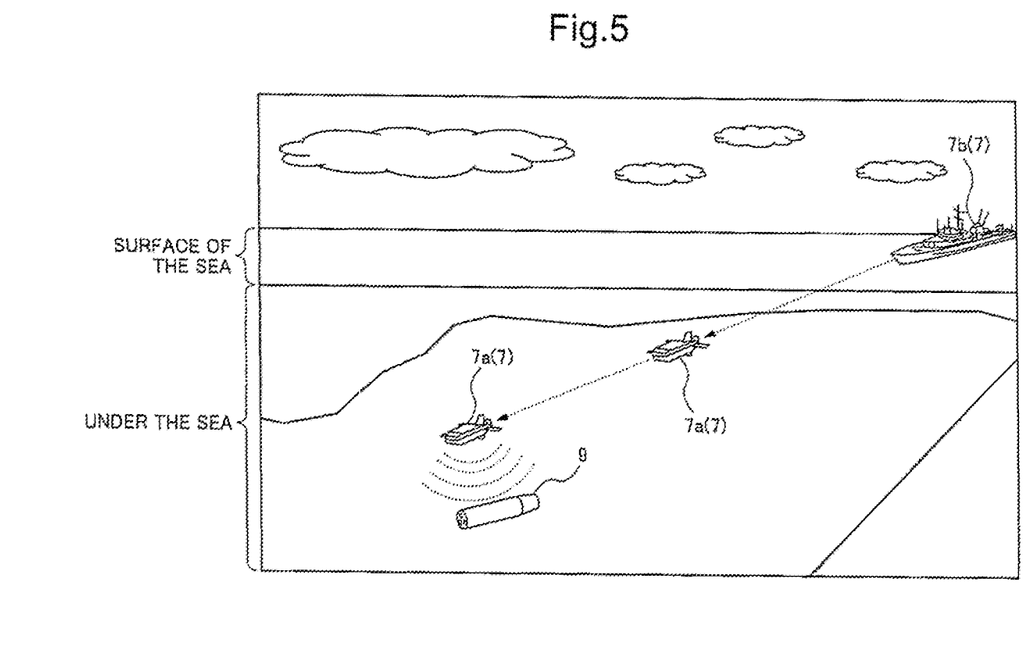
FIG. 5 is a schematic diagram when an underwater vehicle approached a vehicle position notification apparatus according to an exemplary embodiment.
Figure 6:
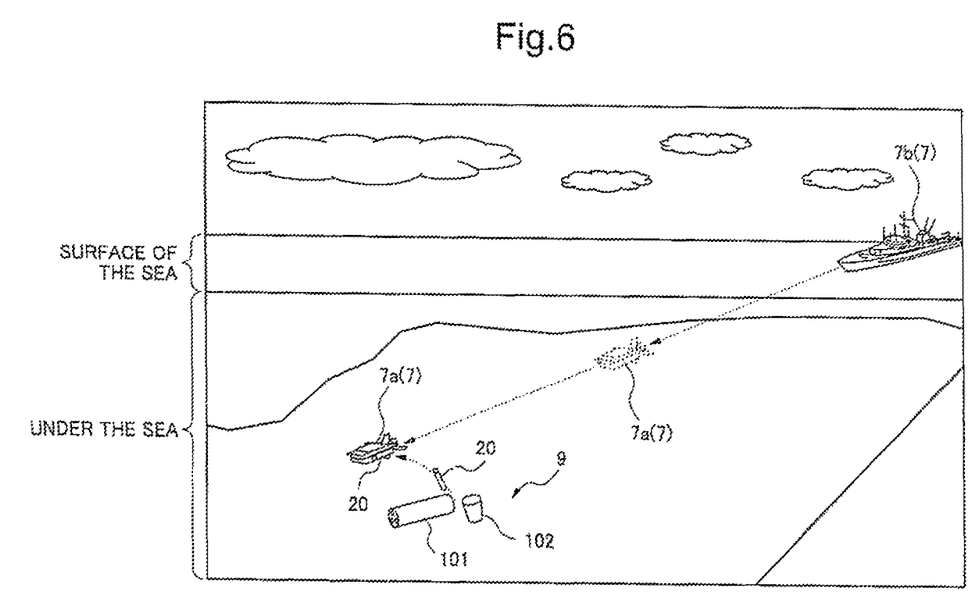
FIG. 6 is a schematic diagram when a movement notification body according to an exemplary embodiment adheres to an underwater vehicle.
Figure 7:
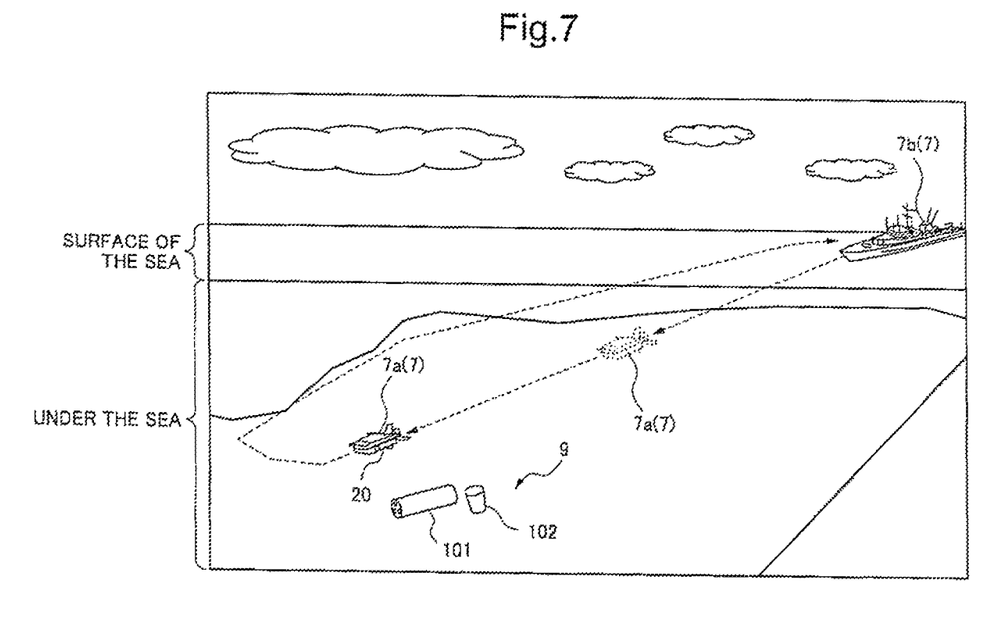
FIG. 7 is a schematic diagram when an underwater vehicle detected by a movement notification according to this exemplary embodiment returns to a mother ship from which it started.
Figure 8:
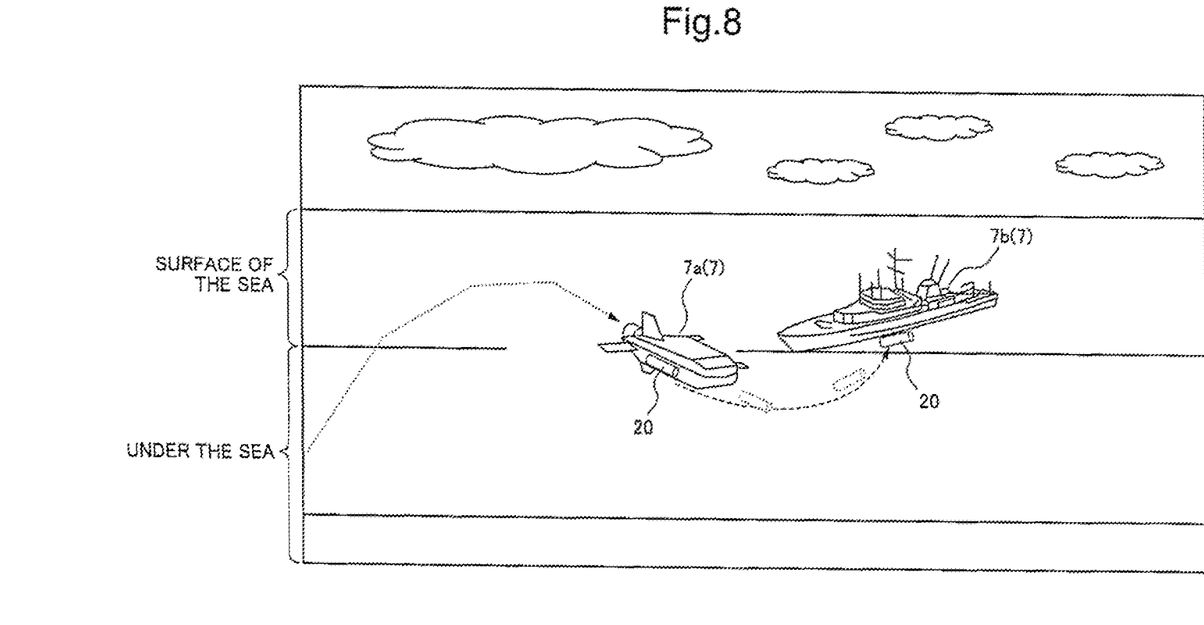
FIG. 8 is a schematic diagram when a movement notification body according to an exemplary embodiment adheres to a mother ship again.

Next, operation of the above-mentioned vehicle position notification apparatus will be described with reference to FIGS. 4-8. FIG. 4 is a flow chart of a position notification apparatus of a vehicle. FIG. 5 is a schematic diagram when unconfirmed underwater vehicle 7a approached vehicle position notification apparatus 9. FIG. 6 is a schematic diagram when vehicle position notification apparatus 9 adheres to approached underwater vehicle 7a. FIG. 7 is a schematic diagram when underwater vehicle 7a to which the movement notification body 20 adheres returns to the mother ship 7b from which it started. FIG. 8 is a schematic diagram when the movement notification body 20 re-adheres to the mother ship 7b from underwater vehicle 7a, when underwater vehicle 7a returns to the mother ship 7b.

Step S1: Detection of underwater vehicle 7a by the detection unit 202 begins. And as shown in FIG. 5, when underwater vehicle 7a approaches vehicle position notification apparatus 9, the detection unit 202 detects an acoustic signal or a magnetic signal which underwater vehicle 7a transmits and outputs a start signal to the can body control unit 205.

Step S2: When the start signal is received from the detection unit 202, the can body control unit 205 drives the horizontal thruster 208 and makes the movement notification body 20 start from the underwater body 10, as shown in FIG. 6. As a result, the movement notification body 20 adheres to underwater vehicle 7a.

Step S3: When the movement notification body 20 adheres to underwater vehicle 7a, the communication unit 204 is started. Then the movement notification body 20 moves while adhering to underwater vehicle 7a, and at a fixed time interval or when a condition decided in advance is satisfied, transmits the current position information using the communication unit 204. This position is the position of the movement notification body 20, that is, the position of underwater vehicle 7a. Step S4: When the current position of the movement notification body 20 is notified, the detection unit 202 continues detection of the acoustic signal or the magnetic signal. This is, as shown in FIG. 7, in order to detect the mother ship 7b to which underwater vehicle 7a returns. Step S5: When it is judged that the underwater vehicle 7a has returned to the mother ship 7b, as shown in FIG. 8, the movement notification body 20 leaves from the underwater vehicle 7a and adheres to the mother ship 7b. Step S6: After that, at a fixed time interval or when a condition decided in advance is satisfied, the movement notification body 20 transmits the current position information using the communication unit 204.

Further, the communication unit 204 or the movement can body 201 includes, as the need arises, a mobility inhibition unit such as a bursting charge which deteriorates mobility of the body under detection 7 by causing damage physically, electrically or chemically. And when a condition decided in advance is satisfied in the communication unit 204, or when the communication unit 204 receives a mobility inhibition command from outside, a mobility inhibition unit is operated, and mobility of the body under detection 7 is inhibited.

As has been described above, because the movement notification body adheres to a body under detection and transmits an acoustic marker by the acoustic pinger, successive position detection of the body under detection becomes possible.

Also, because the movement notification body which adhered to a body under detection re-adheres to the mother ship and notifies the position of the mother ship when it detects the neighborhood of the mother ship, position detection of the mother ship becomes possible.

Also, by operating a mobility inhibition unit such as a bursting charge loaded in the movement notification body, it is possible to inhibit mobility of a body under detection, and hold it at the place.

The present invention is effective for tracking and so on of the underwater vehicle which enters an exclusive economic zone, or of the underwater vehicle which invades important domestic harbors or channels, and so on, and is available for observation of, such as a harbor, a channel or a sea area, and for marine guard and so on.

The position information method of vehicle can do what is made the program so that the computer can be executed. This program is recordable on the information recording medium which the computer can read.

Although an exemplary embodiment of the present invention has been described specifically above, the present invention is not limited to the above-mentioned exemplary embodiment, and various transformation based on the technical idea of this invention is possible. Characteristics of the present invention are summarized as follows.

[Note 1]
A vehicle position notification apparatus comprising:
a main body unit which includes at least a detection unit, an attachment unit and a communication unit; wherein
the detection unit detects a body under detection;
the attachment unit makes the main body unit adhere to the body under detection detected; and
the communication unit transmits position information of the main body unit.

[Note 2]
A vehicle position notification apparatus described in note 1, further comprising:
an underwater movement unit which makes the main body unit move in an water; and
a control unit which controls and drives of the underwater movement unit in a moving direction of the body under detection, when the body under detection is detected.

[Note 3]
A vehicle position notification apparatus described in note 1 or 2, further comprising:
a mobility inhibition unit which inhibits mobility of the body under detection by one method among a physical method, an electrical method and a chemical method.

[Note 4]
A vehicle position notification apparatus described in item 1 of notes 1-3, wherein
the communication unit transmits current position of the main body unit by wireless.

[Note 5]
A vehicle position notification apparatus described in item 1 of notes 1-4, wherein
the communication unit transmits an acoustic signal using an acoustic pinger.

[Note 6]
A vehicle position notification apparatus described in item 1 of notes 1-5, further comprising:
an underwater can body which stores a can body unit which stores the movement notification body and a power supply unit which supplies electric power to the movement notification body; and
a movement notification body which stores the detection unit, the movement unit, the control unit, the attachment unit and the communication unit.

[Note 7]
A vehicle position notification apparatus described in note 6, wherein
the communication unit includes a GPS receiver which measures current position and transmits the current position measured by the GPS receiver.

[Note 8]
A vehicle position notification apparatus described in note 6 or 7, wherein
when the body under detection detected is supposed to be a first body under detection and the body under detection to which this first body under detection returns to be a second body under detection, and in case the detection unit of the main body unit which adheres to the first body under detection detects the second body under detection, the can body the control unit performs drive control of the movement unit to make the movement notification body leave from the body under detection and move in a direction of the second body under detection, and
the attachment unit makes the movement notification body adhere to the second body under detection.

[Note 9]
A vehicle position notification apparatus described in note 8, further comprising:
a mobility inhibition unit which is deteriorates mobility of the body under detection by one method among a physical method, an electrical method and a chemical method.

[Note 10]
A vehicle position notification apparatus described in note 9, wherein
the mobility inhibition unit operates when a condition decided in advance is satisfied or when a wireless signal from outside which directs operation is detected.

[Note 11]

A vehicle position notification method comprising:
a step for detecting a body under detection;
a step for directing movement in a direction of the body under detection when the body under detection is detected;
a step for directing to adhere to the body under detection; and
a step for transmitting position information of the body under detection, periodically or intermittently.

[Note 12]

A vehicle position notification method described in note 11, further comprising:
a step for directing detection of the second body under detection when the body under detection detected is supposed to be a first body under detection, and the body under detection to which this first body under detection returns to be supposed a second body under detection;
a step for directing leaving from the first body under detection when the second body under detection is detected;
a step for directing movement in a direction of the second body under detection after leaving from the first body under detection;
a step for directing to adhere to the second body under detection; and
a step for transmitting position information of the second body under detection which is adhered to, periodically or intermittently.

[Note 13]

A vehicle position notification method described in note 11 or note 12, further comprising:
a step for deteriorating mobility of the body under detection by one method among a physical method, an electrical method and a chemical method.

[Note 14]

A computer-readable medium which stores a program process for making a computer execute position notification of a body under detection, wherein the program process comprising:
a first detection process for detecting the body under detection;
a first movement process for, when the body under detection is detected, directing movement in a direction of the body under detection;
a first adherence process for directing to adhere to the first body under detection; and
a first current position transmission process for transmitting position information of the first body under detection, periodically or intermittently.

[Note 15]

A computer-readable medium described in note 14 which makes a computer execute, further comprising:
a second detection process for directing detection of the second body under detection when the body under detection detected is supposed to be a first body under detection, and the body under detection to which this first body under detection returns to be a second body under detection;
a leaving process for, when the second body under detection is detected, directing leaving from the first body under detection;
a second movement process for directing movement in a direction of the second body under detection after leaving from the first body under detection;
a second adherence process for directing to adhere to the second body under detection; and
a second current position transmission process for transmitting position information of the second body under detection which is adhered to, periodically or intermittently.

[Note 16]

A computer-readable medium described in note 14 or 15 which makes a computer execute, further comprising:
a process for outputting directions which deteriorate mobility of the body under detection by one method among a physical method, an electrical method and a chemical method.

The invention claimed is:

1. A vehicle position notification apparatus comprising:
a main body unit which includes at least a detection unit, an attachment unit, a communication unit, an underwater movement unit, a control unit, and a mobility inhibition unit; wherein
the detection unit detects a target comprising an underwater vehicle and a mother ship to which the underwater vehicle returns;
the communication unit transmits a current position of the main body unit periodically or intermittently;
the underwater movement unit moves the main body unit underwater;
the attachment unit adheres the main body unit to the detected target; and
the control unit performs drive control of the underwater movement unit to move the main body unit towards the underwater vehicle when the underwater vehicle is detected by the detection unit, and to move the main body unit to the mother ship from the underwater vehicle when the mother ship is detected in a state in which the main body unit has already adhered to the underwater vehicle; and
a mobility inhibition unit that inhibits mobility of the target by causing damage physically, electrically or chemically, when a condition decided in advance is satisfied in the communication unit or when the communication unit receives an external mobility inhibition command.

2. The vehicle position notification apparatus according to claim 1, wherein
the communication unit transmits a current position of the main body unit in a wireless manner.

3. The vehicle position notification apparatus according to claim 1, wherein
the communication unit transmits an acoustic signal using an acoustic pinger.

4. The vehicle position notification apparatus according to claim 1, wherein
the communication unit includes a global positioning system (GPS) receiver which measures a current position thereof and transmits the current position measured by the GPS receiver.

5. A vehicle position notification apparatus according to claim 1, wherein
the mobility inhibition unit operates when a predetermined condition is satisfied or when a wireless signal from outside the vehicle position notification apparatus and which directs operation thereof is detected.

6. A vehicle position notification method comprising:
a step for detecting a target comprising a underwater vehicle and a mother ship to which the underwater vehicle returns, by a detection unit;
a step for transmitting a current position of a main body unit, periodically or intermittently;
a step for moving the main body unit underwater by an underwater movement unit, towards the underwater vehicle when the underwater vehicle is detected by the detection unit, and for moving the main body unit to the mother ship from the underwater vehicle when the mother ship is detected in a state in which the main body unit has already adhered to the underwater vehicle;

a step for adhering the main body unit to the detected target by an attachment unit;

a step for drive controlling the underwater movement unit to move the main body unit towards the target when the target is detected; and a step for inhibiting mobility of the target by causing damage physically, electrically, or chemically, when a condition decided in advance is satisfied or responsive to receiving an external mobility inhibition command.

7. A non-transitory computer-readable medium which stores a program process for making a computer execute position notification of a body under detection, wherein the program process comprising:

a detection process for detecting a target comprising a underwater vehicle and a mother ship to which the underwater vehicle returns, by a detection unit;

a transmission process for transmitting a current position of a main body unit periodically or intermittently;

a movement process for moving the main body unit underwater by an underwater movement unit, towards the underwater vehicle when the underwater vehicle is detected by the detection unit, and for moving the main body unit to the mother ship from the underwater vehicle when the mother ship is detected in a state in which the main body unit has already adhered to the underwater vehicle;

an adhesion process for adhering the main body unit to the detected target by an attachment unit;

a control process for drive controlling the underwater movement unit to move the main body unit towards the target when the target is detected; and a process for inhibiting mobility of the target by causing damage physically, electrically, or chemically, when a condition decided in advance is satisfied or responsive to receiving an external mobility inhibition command.

* * * * *